L. A. REBASZ.
NUTS.
No. 180,064. Patented July 18, 1876.
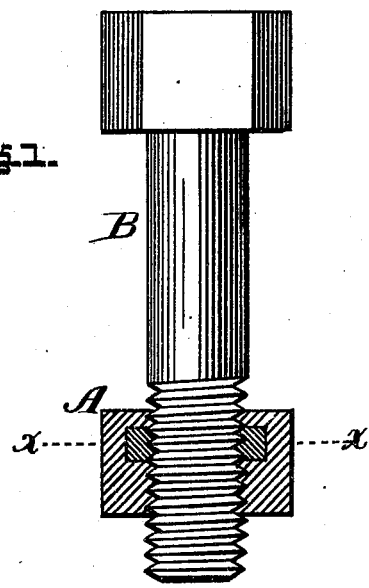
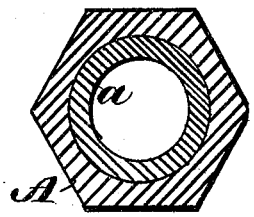
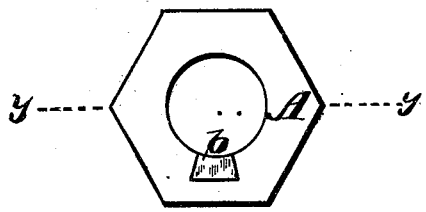
WITNESSES:
Jas. F. DuHamel,
H. B. Brown
INVENTOR:
L. A. Rebasz
PER
H. J. Abbot.
ATTORNEY.

UNITED STATES PATENT OFFICE.

LYMAN A. REBASZ, OF LOCKPORT, NEW YORK.

IMPROVEMENT IN NUTS.

Specification forming part of Letters Patent No. 180,064, dated July 18, 1876; application filed June 17, 1876.

*To all whom it may concern:*

Be it known that I, LYMAN A. REBASZ, of Lockport, in the county of Niagara and State of New York, have invented certain new and useful Improvements in Burrs or Nuts, of which the following is a specification:

The nature of my invention relates to an improvement in burrs or nuts, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a side elevation of the bolt, with the nut in section. Fig. 2 is a section of the nut through the line $x\,x$, Fig. 1. Figs. 3 and 4 show a modification of my device.

A represents a burr or nut, having an inner groove or slot filled with rubber or other elastic material, whose pressure and friction shall prevent said burr or nut from jarring loose from its position on the bolt. B is a bolt made in any suitable or well-known form. $a$ shows the nut grooved on its inner side in a circular form. $b$ shows a nut slotted or dovetailed vertically on its inner side. Grooves $a$ and $b$ may be made, as shown, or in any manner, provided they are on the inner side of the burr or nut.

The bottom of a nut has heretofore been hollowed out and filled by a washer, held in place by a button, or other similar device; but this style of device does not support the washer upon all its side surfaces. I do not limit myself to one groove.

These grooves or slots are filled in any suitable manner, with rubber or other adhesive or elastic material, which shall not only exert pressure on the thread of the bolt, but act as a packing between them.

Having thus fully described my invention, what I claim as new, and desire to secure by Letters Patent, is—

A burr or nut, having a groove wholly within the inner side, as shown, filled with rubber or other adhesive or elastic material, such material being supported on all of its side surfaces by the grooved nut and the bolt, substantially as shown and described.

In testimony that I claim the foregoing as my own I affix my signature in the presence of two witnesses.

LYMAN A. REBASZ.

Witnesses:
 J. A. DRIESS,
 FRANK C. LILLIS.